C. Willard.
Wheel Cultivator.

N° 61,906. Patented Feb. 5, 1867.

Witnesses
J. J. Peyton
John A. Dodge

Inventor,
Charles Willard
Per Baldwin & Son, Attys

United States Patent Office.

CHARLES WILLARD, OF NEWTOWN, PENNSYLVANIA.

Letters Patent No. 61,906, dated February 5, 1867.

IMPROVEMENT IN CULTIVATORS.

The Schedule referred to in these Letters Patent and making part of the same.

TO ALL WHOM IT MAY CONCERN:

Be it known that I, CHARLES WILLARD, of Newtown, in the county of Bucks, and State of Pennsylvania, have invented a new and useful Improvement in Cultivators or Corn-Ploughs, of which the following is a full, clear, and exact description, reference being had to the accompanying drawings, which make part of this specification, and in which—

It is the object of my invention to simplify an adjustable cultivator or corn-plough, and render it adaptable to the culture of crops in varying stages of their growth; and to this end my invention consists, first, in forming the frame of the cultivator or plough in two separate parts, and uniting them by adjustable arched bars, the front one of which forms also a socket for the reception of the tongue; second, in arranging the centre teeth or ploughs beneath the frame, and attaching them thereto adjustably, so that they can be moved independent of the frame, to cultivate plants growing irregularly in rows without tearing them up by the roots.

Figure 1:
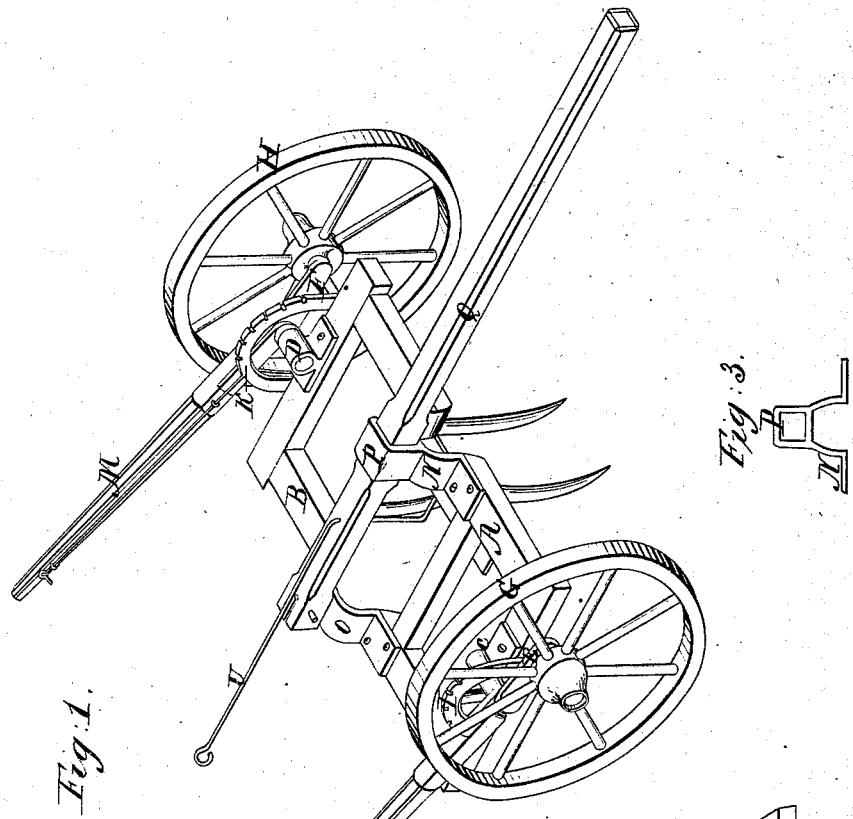
Figure 1 is a view in perspective of my cultivator or plough.
Figure 3:
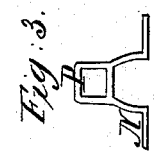
Figure 3 is a view in front elevation of the front arched bar that unites the separate frames, and forms a socket for the tongue.
Figure 2:
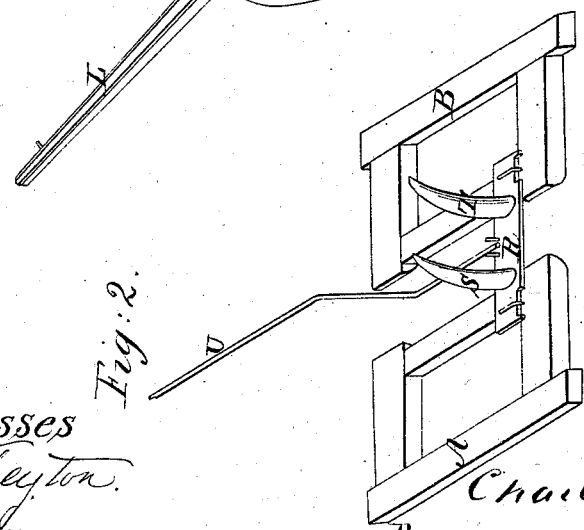
Figure 2 is an under side view of the front teeth, or ploughs, showing my mode of attaching them to the frame.

I construct two rectangular frames, A and B, of suitable strength for a cultivator. To the outside of each I secure bearings, C and D, for bent axles E and F, for the wheels G and H to run upon. Over the bearings C and D I attach to the frame arched notched bars I and K, and to the bent axles E and F I secure hand-levers L and M, having sliding stay-rods upon them to take into the notches in the arches, and hold the frame at any desired distance from the ground for regulating the depth of ploughing, or controlling the parallelism of the frame to the surface of the ground under culture. The rectangular frames A and B are united by arched coupling-bars N and O. The bar N is the one in front, and is formed with a rectangular box, P, on its top, in which to insert the tongue Q, while the rear end of the tongue may be secured to the top of the rear arched coupling-bar O in any secure manner. The arched coupling-bars may be made adjustable at both ends, and thus the ploughs or cultivator teeth secured to the frame may be brought closer together when it is desirable to plough near the plants, while the elevation of the arched coupling-bars, and the action of the bent axles, render my cultivator capable of working over well-grown crops without injury to the standing plants. Beneath the front timbers of the frame, I secure, in proper guides, a plate, R, to which I attach cultivator teeth or ploughs S and T, as in fig. 2, and I attach a bent rod, U, to the plate R. The rod being passed through the tongue, acts as a lever, by which the front cultivator teeth or ploughs may be moved to either side, and thus, while the cultivator is in operation, the driver can shift these teeth from right to left, or *vice versa*, and thus cultivate as close as necessary to the growing plants without tearing them up by the roots, even when they have been planted or come up out of line. The bar R may be removed when cultivating the taller growth of the plants, without affecting the operation of the cultivator teeth in the frame.

What I claim as my invention, and desire to secure by Letters Patent, is—

1. The combination of the adjustable arched couplings N and O with the frames A and B, and rigid ploughs, and rigid tongue, all constructed, arranged, and operating substantially as and for the purpose set forth.

2. The combination of the plate R, carrying cultivator teeth or ploughs, with the frames, and with the rod U, when arranged to operate substantially in the manner and for the purpose set forth.

In testimony whereof I have hereunto subscribed my name.

CHAS. WILLARD.

Witnesses:
RICHARD BOOTH,
THOMAS G. KELLY.